United States Patent
Sezaki et al.

(10) Patent No.: US 12,542,766 B2
(45) Date of Patent: Feb. 3, 2026

(54) INFORMATION PROCESSING APPARATUS, INFORMATION PROCESSING METHOD, AND PROGRAM

(71) Applicant: KABUSHIKI KAISHA TOSHIBA, Tokyo (JP)

(72) Inventors: Kentaro Sezaki, Kawasaki Kanagawa (JP); Takuma Akagi, Tokyo (JP); Bunpei Irie, Kawasaki Kanagawa (JP); Tomoyuki Hamamura, Tokyo (JP); Yasuhiro Ohkawa, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 257 days.

(21) Appl. No.: 18/181,947

(22) Filed: Mar. 10, 2023

(65) Prior Publication Data

US 2023/0216834 A1   Jul. 6, 2023

Related U.S. Application Data

(63) Continuation of application No. PCT/JP2021/033759, filed on Sep. 14, 2021.

(30) Foreign Application Priority Data

Sep. 18, 2020   (JP) ................................. 2020-157639

(51) Int. Cl.
*G06V 30/148* (2022.01)
*G06F 21/62* (2013.01)
(Continued)

(52) U.S. Cl.
CPC .......... *H04L 63/04* (2013.01); *G06F 21/6245* (2013.01); *G06F 21/6254* (2013.01);
(Continued)

(58) Field of Classification Search
CPC ...... G06F 21/60; G06F 21/62; G06F 21/6218; G06F 21/6245; G06F 21/6254;
(Continued)

(56) References Cited

U.S. PATENT DOCUMENTS 10,089,490 B2   10/2018   Terada et al.
2008/0244378 A1   10/2008   Chen
(Continued)

FOREIGN PATENT DOCUMENTS

JP   2001-14423 A   1/2001
JP   2004-5386 A   1/2004
(Continued)

OTHER PUBLICATIONS

IP Australia, Examination Report No. 1 for Application No. 2021343666, 4 pages (Oct. 9, 2023).
(Continued)

*Primary Examiner* — D'Arcy Winston Straub
(74) *Attorney, Agent, or Firm* — Finnegan, Henderson, Farabow, Garrett & Dunner, LLP (57) ABSTRACT

According to an embodiment, an information processing apparatus comprises a first interface, a second interface, a third interface, and a processor. The first interface acquires a character string image that includes a character string. The second interface transmits and receives data to and from an internal device through a first network. The third interface transmits and receives data to and from an external device through a second network. The processor transmits, if the character string image includes personal information, the character string image to the internal device through the second interface and receive an input of the character string from the internal device and transmits, if the character string image does not include the personal information, the character string image to the external device through the third
(Continued)

interface and receive an input of the character string from the external device.

13 Claims, 7 Drawing Sheets

(51) Int. Cl.
*G06V 30/10* (2022.01)
*G06V 30/19* (2022.01)
*H04L 9/40* (2022.01)

(52) U.S. Cl.
CPC ...... *G06V 30/153* (2022.01); *G06V 30/19173* (2022.01); *H04L 63/0407* (2013.01); *G06V 30/10* (2022.01)

(58) Field of Classification Search
CPC ...... G06V 30/10; G06V 30/14; G06V 30/148; G06V 30/153; G06V 30/19; G06V 30/191; G06V 30/19173; H04L 63/04; H04L 63/0407
See application file for complete search history.

(56) References Cited

U.S. PATENT DOCUMENTS

| | | | | |
|---|---|---|---|---|
| 2011/0286023 | A1* | 11/2011 | Hagisawa | G06F 40/174 358/1.13 |
| 2013/0222836 | A1* | 8/2013 | Kakegawa | G06F 21/55 358/1.14 |
| 2015/0121542 | A1* | 4/2015 | Kinoshita | G06F 21/608 726/26 |
| 2017/0212896 | A1 | 7/2017 | Iwakura | |
| 2019/0279041 | A1* | 9/2019 | Kimura | G06V 30/19167 |
| 2019/0325272 | A1* | 10/2019 | Tatsumi | G06F 18/2163 |
| 2020/0042837 | A1* | 2/2020 | Skinner | H04L 63/102 |
| 2020/0097713 | A1 | 3/2020 | Cramer et al. | |
| 2020/0293680 | A1 | 9/2020 | Navarro-Dimm et al. | |

FOREIGN PATENT DOCUMENTS

| | | |
|---|---|---|
| JP | 2008-259156 A | 10/2008 |
| JP | 5312701 B1 | 10/2013 |
| JP | 6052462 B2 | 12/2016 |
| JP | 2019-82974 A | 5/2019 |
| JP | 2020-107330 A | 7/2020 |
| KR | 10-2016-0091307 A | 8/2016 |

OTHER PUBLICATIONS

European Patent Office, Extended European Search Report in EP App. No. 21869360.4, 9 pages (Aug. 16, 2024).
Japan Patent Office, International Search Report in Int'l App. N. PCT/JP2021/033759 (Sep. 14, 2021).
Canadian Intellectual Property Office, Office Action in CA App. No. 3,190,695, 7 pages (Jul. 26, 2024).
Intellectual Property Office of Singapore, Office Action in SG App. No. SP 106650 (Sep. 5, 2025).

* cited by examiner

| Package ID | Image ID | Distribution destination | Category | Keying result |
|---|---|---|---|---|
| 0001 | 0001-01 | Cloud | Name | ABCDEF |
| | 0001-02 | Cloud | Address | AAABBBCCC 123-456 |
| | 0001-03 | Cloud | Telephone number | 012345678 |
| 0002 | 0002-01 | Site | Name | XXXXXX |
| | | | Address | ZZZZYYYY 9999 |
| | 0002-02 | Cloud | Telephone number | 000000000 |
| 0003 | 0003-01 | Site | Name | TARO AABBCC |
| | | | Address | TOKYO MINATO-KU ZZZZ11-22 |

F I G. 8

| Package ID | Image ID | Distribution destination | Category | Keying result |
|---|---|---|---|---|
| 0001 | 0001-01-01 | Cloud | Name (Last name) | ABC |
| | 0001-01-02 | Cloud | Name (First name) | DEF |
| | 0001-02-01 | Cloud | Address (First half) | AAABBBCCC |
| | 0001-02-02 | Cloud | Address (Second half) | 123-456 |
| | 0001-03 | Cloud | Telephone number | 012345678 |
| 0002 | 0002-01 | Site | Name | XXXXXX |
| | | | Address | ZZZZYYYY 9999 |
| | 0002-02 | Cloud | Telephone number | 000000000 |
| 0003 | 0003-01 | Site | Name | TARO AABBCC |
| | | | Address | TOKYO MINATO-KU ZZZZ11-22 |

INFORMATION PROCESSING APPARATUS, INFORMATION PROCESSING METHOD, AND PROGRAM

CROSS REFERENCE TO RELATED APPLICATIONS

This application is a Continuation Application of PCT Application No. PCT/JP2021/033759, filed Sep. 14, 2021 and based upon and claiming the benefit of priority from Japanese Patent Application No. 2020-157639, filed Sep. 18, 2020, the entire contents of all of which are incorporated herein by reference.

FIELD

Embodiments described herein relate generally to an information processing apparatus, an information processing method, and a program.

BACKGROUND

There is a system that displays an image showing a character string and receives an operator's input of the character string. Such a system transmits an image to a video coding device (VCD) and acquires a character string that has been input to the VCD.

Such a character string may include personal information with which an individual can be identified, such as an address and a name.

With a conventional system, there has been a risk of personal information leakage if an image is transmitted to a VCD through an external network such as the Internet.

CITATION LIST

Patent Literature

Patent Literature 1: Jpn. Pat. Appln. KOKAI Publication No. 2004-005386

SUMMARY

Technical Problem

To solve the above-described problem, an information processing apparatus, an information processing method, and a program that are capable of preventing personal information from being leaked and receiving an input of a character string from an external apparatus at the same time is provided.

Solution to Problem

According to an embodiment, an information processing apparatus comprises a first interface, a second interface, a third interface, and a processor. The first interface acquires a character string image that includes a character string. The second interface transmits and receives data to and from an internal device through a first network. The third interface transmits and receives data to and from an external device through a second network. The processor transmits, if the character string image includes personal information, the character string image to the internal device through the second interface and receive an input of the character string from the internal device and transmits, if the character string image does not include the personal information, the character string image to the external device through the third interface and receive an input of the character string from the external device.

DETAILED DESCRIPTION

Hereinafter, embodiments will be described with reference to the drawings.

In an input system according to an embodiment, a predetermined processing apparatus performs OCR processing on an image that includes a character string, such as a name or an address. If the OCR processing (character recognition processing) is successful, the predetermined processing apparatus performs a predetermined operation based on the OCR result.

If the OCR processing fails, the input system causes the VCD to display the image. The input system receives from an operator an input of a character string included in an image. The input system inputs the input character string to the predetermined processing apparatus. The predetermined processing apparatus of the input system performs a predetermined operation based on the input character string.

Figure 1:
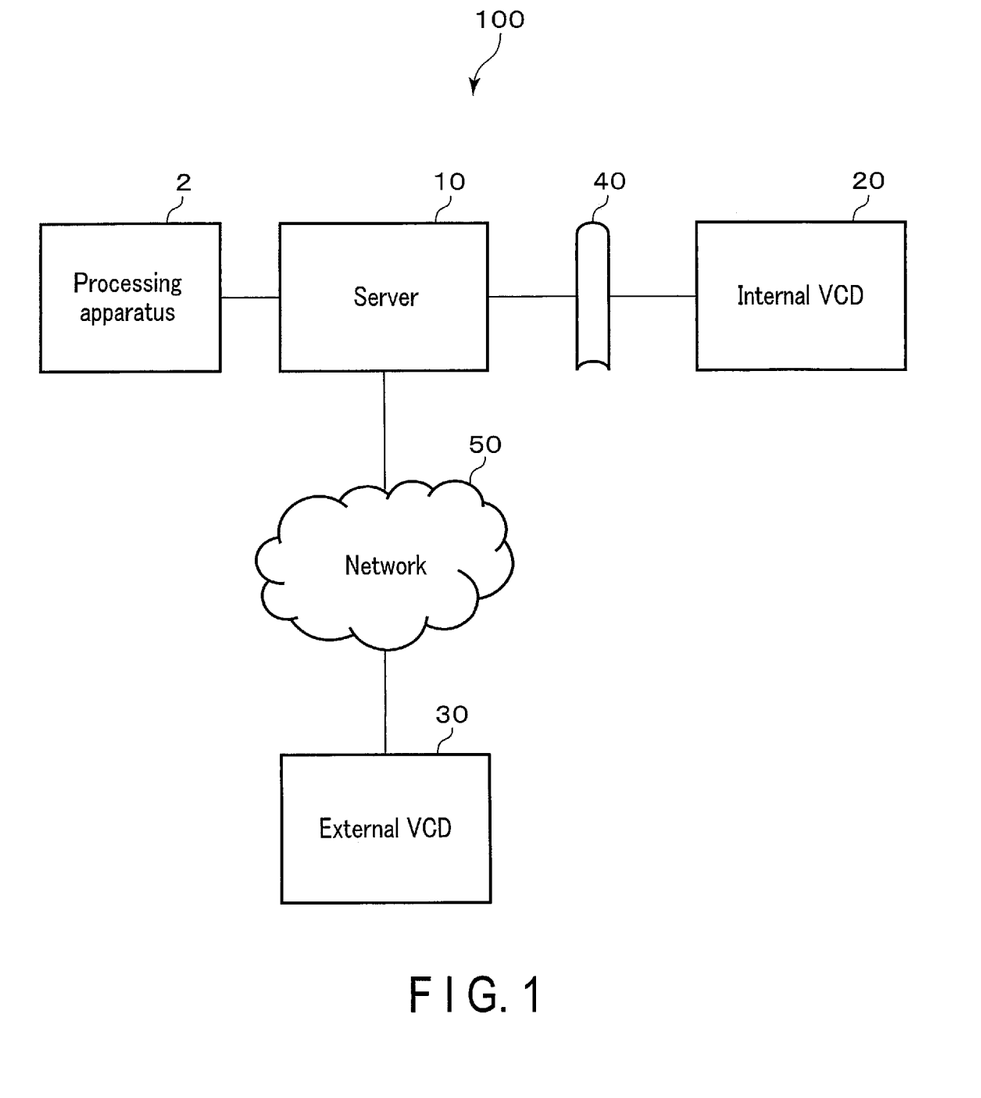
FIG. 1 is a block diagram illustrating a configuration example of an input system according to an embodiment.

FIG. 1 illustrates a configuration example of an input system 100 according to an embodiment. As illustrated in FIG. 1, the input system 100 includes a processing apparatus 2, a server 10, an internal VCD 20, an external VCD 30, and the like. The processing apparatus 2 is connected to the server 10. The server 10 is connected to the network 40 and the network 50. The internal VCD 20 is connected to the network 40. The external VCD 30 is connected to the network 50.

The input system 100 may include an element as needed in addition to the elements illustrated in FIG. 1, and a specific element may be excluded from the input system 100.

The processing apparatus 2 is an apparatus that performs predetermined processing. For example, the processing apparatus 2 is a sorter that sorts an article such as mail or a package into a shooter or the like. The processing apparatus 2 captures an image of an address face (a side on which a name, an address, a telephone number, or the like is written) of an article using a camera. When the address face is photographed, the processing apparatus 2 performs OCR processing on an image showing the address face (a destination image or a character string image) in accordance with a predetermined algorithm.

Upon performance of OCR processing, the processing apparatus 2 acquires information (description information) written on the address face of the article based on the result of the OCR processing. Upon acquisition of the description information, the processing apparatus 2 sorts the article based on the acquired description information.

If the OCR processing fails and the destination cannot be acquired, the processing apparatus 2 transmits the destination image to the server 10.

As described later, the server 10 transmits the description information shown in the destination image to the processing apparatus 2.

The processing apparatus 2 acquires the description information from the server 10. When the description information is acquired, the processing apparatus 2 sorts the article based on the acquired destination.

The server 10 (information processing device) receives an input of a character string included in the destination image, using the internal VCD 20 and the external VCD 30. The server 10 transmits the destination image (or a part of the destination image) to the internal VCD 20 or the external VCD 30. The server 10 acquires a character string that has been input to the internal VCD 20 or the external VCD 30. The server 10 will be described in detail later.

The internal VCD 20 (internal device) receives from the server 10 an input of the character string included in the destination image. The internal VCD 20 acquires the destination image from the server 10 through the network 40. The internal VCD 20 displays the destination image from the server 10 and receives an input of the character string from the operator. The internal VCD 20 will be described in detail later.

The external VCD 30 (external device) receives an input of the character string included in the destination image from the server 10. The external VCD 30 acquires the destination image from the server 10 through the network 50. The external VCD 30 displays the destination image acquired from the server 10 and receives an input of the character string from the operator. The external VCD 30 will be described in detail later.

The network 40 (first network) is a network that relays communication between the server 10 and the internal VCD 20. The network 40 is a network that relays local communication. For example, the network 40 is a local area network.

The network 50 (second network) is a network that relays communication between the server 10 and an external VCD 30. The network 50 is a network that relays global communication. For example, the network 50 is the Internet.

Next, a configuration example of the server 10 will be described.

Figure 2:
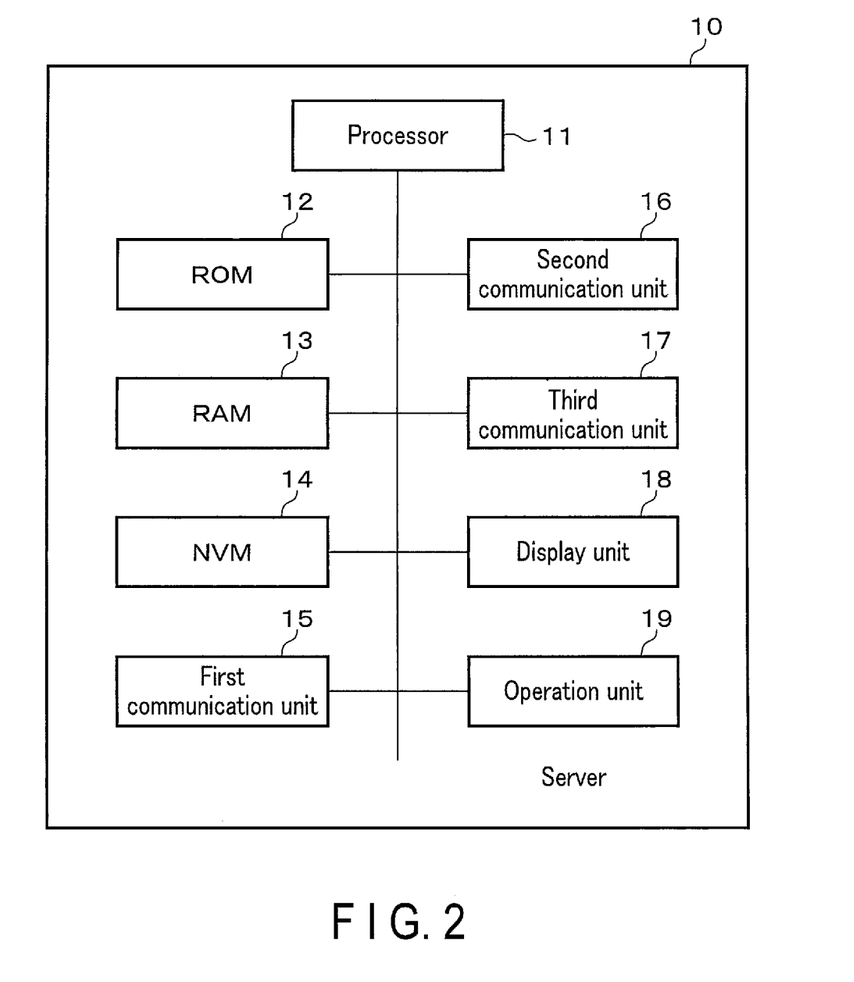
FIG. 2 is a block diagram illustrating a configuration example of a server according to the embodiment.

FIG. 2 is a block diagram illustrating a configuration example of the server 10. As illustrated in FIG. 2, the server 10 includes a processor 11, a ROM 12, a RAM 13, an NVM 14, a first communication unit 15, a second communication unit 16, a third communication unit 17, an operation unit 18, a display unit 19, and the like.

The processor 11, the ROM 12, the RAM 13, the NVM 14, the first communication unit 15, the second communication unit 16, the third communication unit 17, the operation unit 18, and the display unit 19 are connected to each other via a bus or the like.

The server 10 may include an element in addition to the elements illustrated in FIG. 2 as needed, and a specific element may be excluded from the server 10.

The processor 11 has a function of controlling the entire operation of the server 10. The processor 11 may include an internal cache, various interfaces, and the like. The processor 11 realizes various processes by executing a program stored in advance in the internal memory, the ROM 12, or the NVM 14.

Some of the various functions realized by the processor 11 executing the program may be realized by a hardware circuit. In this case, the processor 11 controls the function executed by the hardware circuit.

The ROM 12 is a non-volatile memory in which a control program, control data, and the like are stored in advance. The control program and control data stored in the ROM 12 are incorporated in advance according to the specifications of the server 10. The ROM 12 stores, for example, a program for controlling a circuit substrate of the server 10.

The RAM 13 is a volatile memory. The RAM 13 temporarily stores data that is being processed by the processor 11. The RAM 13 stores various application programs based on an instruction from the processor 11. The RAM 13 may store information necessary for executing the application programs, results of running the application programs, and the like.

The NVM 14 is a data-writable and rewritable nonvolatile memory. The NVM 14 includes, for example, a hard disk drive (HDD), a solid state drive (SDD), a flash memory, or the like. The NVM 14 stores control programs, applications, various kinds of information, and the like in accordance with the operational use of the server 10.

The first communication unit 15 (first interface) is an interface for transmitting and receiving data to and from the processing apparatus 2. For example, the first communication unit 15 is an interface that supports a wired or wireless local area network (LAN) connection.

The second communication unit 16 (second interface) is an interface for transmitting and receiving data to and from the internal VCD 20. That is, the second communication unit 16 is connected to the network 40. For example, the second communication unit 16 is an interface that supports a wired or wireless LAN connection.

The third communication unit 17 (third interface) is an interface for transmitting and receiving data to and from an external VCD 30. That is, the third communication unit 17 is connected to the network 50. For example, the third communication unit 17 is an interface that supports a wired or wireless LAN connection.

The operation unit 18 receives inputs of various operations from an operator. The operation unit 18 transmits a signal indicating the received operation to the processor 11. For example, the operation unit 18 is constituted by a keyboard, a numeric keypad, and a touch panel.

The display unit 19 displays various kinds of information under the control of the processor 11. For example, the display unit 19 is constituted by a liquid crystal monitor. When the operation unit 18 is constituted by a touch panel or the like, the display unit 19 may be formed integrally with the operation unit 18.

The first communication unit 15, the second communication unit 16, and the third communication unit 17 may be integrally formed.

For example, the server 10 is a desktop PC, a notebook PC, or the like.

Next, a configuration example of the internal VCD 20 will be described.

Figure 3:
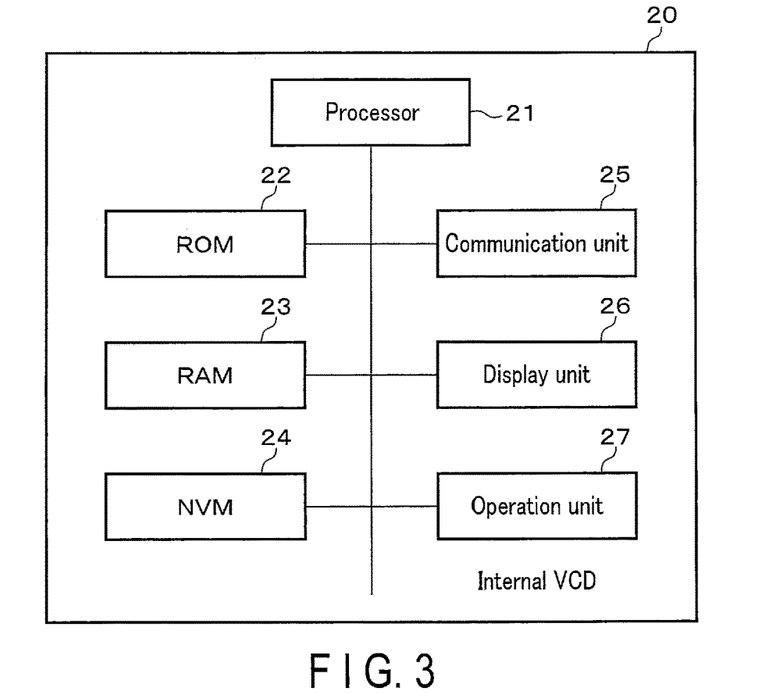
FIG. 3 is a block diagram illustrating a configuration example of an internal VCD according to the embodiment.

FIG. 3 is a block diagram showing a configuration example of the internal VCD 20. As shown in FIG. 3, the internal VCD 20 includes a processor 21, a ROM 22, a RAM 23, an NVM 24, a communication unit 25, an operation unit 26, a display unit 27, and the like.

The processor 21, the ROM 22, the RAM 23, the NVM 24, the communication unit 25, the operation unit 26, and the display unit 27 are connected to each other via a data bus or the like.

The internal VCD 20 may include an element in addition to the elements illustrated in FIG. 3 as needed, and a specific element may be excluded from the internal VCD 20.

The processor 21 has a function of controlling the entire operation of the internal VCD 20. The processor 21 may include an internal cache, various interfaces, and the like. The processor 21 realizes various processes by executing a program stored in advance in the internal memory, the ROM 22, or the NVM 24.

Some of the various functions realized by the processor 21 executing the program may be realized by a hardware circuit. In this case, the processor 21 controls the function executed by the hardware circuit.

The ROM 22 is a non-volatile memory in which a control program, control data, and the like are stored in advance. The control program and control data stored in the ROM 22 are incorporated in advance according to the specifications of the internal VCD 20. The ROM 22 stores, for example, a program for controlling a circuit substrate of the internal VCD 20.

The RAM 23 is a volatile memory. The RAM 23 temporarily stores information that is being processed by the processor 21. The RAM 23 stores various application programs based on an instruction from the processor 21. In addition, the RAM 23 may store data necessary for executing the application program, an execution result of the application program, and the like.

The NVM 24 is a data-writable and rewritable nonvolatile memory. The NVM 24 is constituted by, for example, an HDD, an SSD, or a flash memory. The NVM 24 stores a control program, an application, various kinds of data, and the like according to an operation purpose of the internal VCD 20.

The communication unit 25 is an interface for transmitting and receiving data to and from the server 10. That is, the communication unit 25 is connected to the network 40. For example, the communication unit 25 is an interface that supports a wired or wireless LAN connection.

The operation unit 26 receives inputs of various operations from an operator. The operation unit 26 transmits a signal indicating the received operation to the processor 21. For example, the operation unit 26 is constituted by a keyboard, a numeric keypad, and a touch panel.

The display unit 27 displays various kinds of information under the control of the processor 21. For example, the display unit 27 is constituted by a liquid crystal monitor. When the operation unit 26 is constituted by a touch panel or the like, the display unit 27 may be formed integrally with the operation unit 26.

For example, the internal VCD 20 is a desktop computer, a notebook computer, a tablet computer, or the like.

The processor 21 acquires the destination image from the server 10 through the communication unit 25. Upon acquisition of the destination image, the processor 21 generates an input screen for inputting the character string included in the destination image. For example, the input screen includes a destination image, an input form, etc. The processor 31 causes the display unit 27 to display the generated input screen.

Here, the operator of the internal VCD 20 visually recognizes the destination image and inputs a character string included in the destination image to the operation unit 26.

The processor 21 acquires a character string that is input through the operation unit 26. Upon acquisition of the character string, the processor 21 transmits the acquired character string to the server 10 through the communication unit 25.

Next, a configuration example of the external VCD 30 is described.

Figure 4:
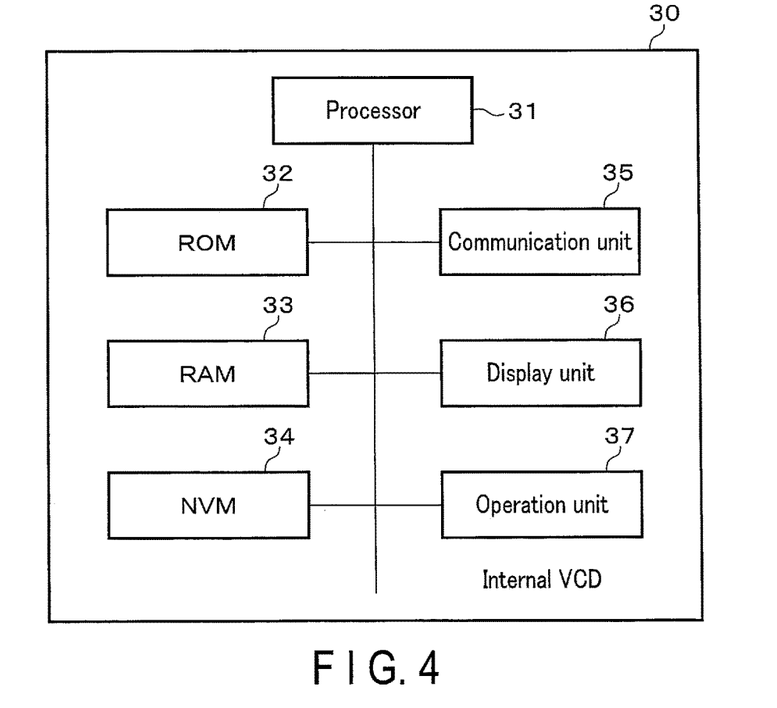
FIG. 4 is a block diagram illustrating a configuration example of an external VCD according to the embodiment.

FIG. 4 is a block diagram showing a configuration example of the external VCD 30. As shown in FIG. 4, the external VCD 30 includes a processor 31, a ROM 32, a RAM 33, a NVM 34, a communication unit 35, an operation unit 36, a display unit 37, and the like.

The processor 31, the ROM 32, the RAM 33, the NVM 34, the communication unit 35, the operation unit 36, and the display unit 37 are connected to each other via a data bus or the like.

The external VCD 30 may include an element in addition to the elements illustrated in FIG. 4 as needed, and a specific element may be excluded from the external VCD 30.

The processor 31 has a function of controlling the entire operation of the external VCD 30. The processor 31 may include an internal cache, various interfaces, and the like. The processor 31 realizes various processes by executing a program stored in advance in the internal memory, the ROM 32, or the NVM 34.

Some of the various functions realized by the processor 31 executing the program may be realized by a hardware circuit. In this case, the processor 31 controls the function executed by the hardware circuit.

The ROM 32 is a non-volatile memory in which a control program, control data, and the like are stored in advance. The control program and control data stored in the ROM 32 are incorporated in advance according to the specifications of the external VCD 30. The ROM 32 stores, for example, a program for controlling a circuit substrate of the external VCD 30.

The RAM 33 is a volatile memory. The RAM 33 temporarily stores information that is being processed by the processor 31. The RAM 33 stores various application programs based on an instruction from the processor 31. In addition, the RAM 33 may store data necessary for executing the application program, an execution result of the application program, and the like.

The NVM 34 is a data-writable and rewritable nonvolatile memory. The NVM 34 is constituted by, for example, an HDD, an SSD, or a flash memory. The NVM 34 stores a control program, an application, various kinds of data, and the like according to an operation purpose of the external VCD 30.

The communication unit 35 is an interface for transmitting and receiving data to and from the server 10. That is, the communication unit 35 is connected to the network 50. For example, the communication unit 35 is an interface that supports a wired or wireless LAN connection.

The operation unit 36 receives inputs of various operations from an operator. The operation unit 36 transmits a signal indicating the received operation to the processor 31. For example, the operation unit 36 is constituted by a keyboard, a numeric keypad, and a touch panel.

The display unit 37 displays various kinds of information under the control of the processor 31. For example, the display unit 37 is constituted by a liquid crystal monitor. When the operation unit 36 is constituted by a touch panel or the like, the display unit 37 may be formed integrally with the operation unit 36.

The external VCD 30 is, for example, a desktop PC, a notebook PC, a tablet PC, a smartphone, a feature phone, or a wearable device.

The processor 31 acquires the destination image from the server 10 through the communication unit 35. Upon acquisition of the destination image, the processor 31 generates an input screen for inputting the character string included in the destination image. For example, the input screen includes a destination image, an input form, etc.

When the input screen is generated, the processor 31 causes the display unit 37 to display the generated input screen.

Here, the operator of the external VCD 30 visually recognizes the destination image and inputs a character string included in the destination image to the operation unit 36.

The processor 31 acquires a character string that is input through the operation unit 36. Upon acquisition of the character string, the processor 31 transmits the acquired character string to the server 10 through the communication unit 35.

Next, functions implemented by the server 10 will be described. The functions implemented by the server 10 are implemented by the processor 11 executing a program stored in the ROM 12 or the NVM 14.

First, the processor 11 has a function of acquiring a destination image from the processing apparatus 2.

As described above, when the OCR processing of the destination image fails, the processing apparatus 2 transmits the destination image to the server 10.

The processor 11 of the server 10 acquires the destination image from the processing apparatus 2 through the first communication unit 15.

The processor 11 may acquire destination images in a batch at predetermined intervals from the processing apparatus 2.

The processor 11 has a function of partitioning the destination image by category.

The category is a category of a character string shown in the destination image. For example, the category is "name", "postal code", "address", "telephone number", or the like.

Figure 5:
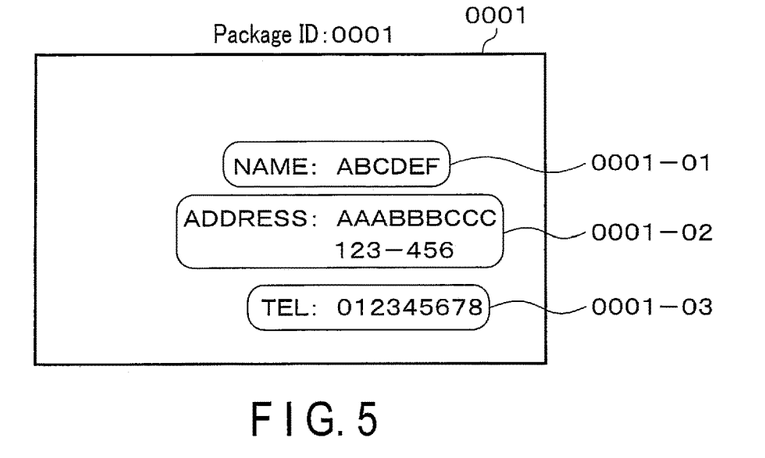
FIG. 5 is a diagram illustrating an operation example of the server according to the embodiment.

FIG. 5 illustrates an example of an operation of partitioning the destination image 0001 by the processor 11. In the example illustrated in FIG. 5, it is assumed that the processor 11 acquires the destination image 0001 from the processing apparatus 2. Further, the package ID for identifying the package shown in the destination image 0001 is 0001.

First, the processor 11 performs OCR processing on the destination image 0001. After the OCR processing, the processor 11 searches for category-indicating keywords from the result of the OCR processing. After the keywords are searched for, the processor 11 sets categories based on the searched for keywords.

In the example illustrated in FIG. 5, the processor 11 searches for "NAME", "ADDRESS", and "TEL" as category-indicating keywords from the result of the OCR processing. The processor 11 sets "name" as a category corresponding to "NAME". The processor 11 sets "address" as a category corresponding to "ADDRESS". The processor 11 sets "telephone number" as a category corresponding to "TEL".

The processor 11 may set a category in accordance with a format stored in advance in the NVM 14. The processor 11 sets a predetermined category for a predetermined area indicated by the format. For example, the processor 11 sets "name" in the first row area and "address" in the second row area.

The method of setting a category by the processor 11 is not limited to a specific method.

After the categories are set, the processor 11 partitions the destination image 0001 according to category. That is, the processor 11 extracts an image that includes a character string of one category (partitioned image). For example, the processor 11 extracts a partitioned image based on the position of the character string read by the OCR processing.

In the example illustrated in FIG. 5, the processor 11 extracts a partitioned image 0001-01 in which the character string of the category "name" is included based on the position at which "NAME" is written (a partitioned image in which "name" is set as the category). For example, the processor 11 extracts an area (character string area) in which a character string is written in the vicinity of the position at which "NAME" is written. Herein, the processor 11 searches for and extracts a character string area, starting the search from the position at which "NAME" is written toward the right. The processor 11 acquires the extracted character string area as the partitioned image 0001-01.

Similarly, the processor 11 extracts a partitioned image 0001-02 that includes the character string of the category "address" (a partitioned image in which "address" is set as the category) based on the position at which "ADDRESS" is written. The processor 11 may extract the partitioned image 0001-02 based on the result of the OCR processing. For example, the processor 11 may extract the partitioned image 0001-02 based on a position at which a character string used to write an address, such as "city", "town" or "ward, is read. For example, the processor 11 may extract a character string area that includes the character string as the partitioned image 0001-02.

Similarly, the processor 11 partitions a partitioned image 0001-03 that includes the character string of the category "telephone number" (a partitioned image in which "telephone number" is set as the category) based on the position at which "TEL" is written.

Next, another example of the operation in which the processor 11 partitions a destination image is described.

Figure 6:
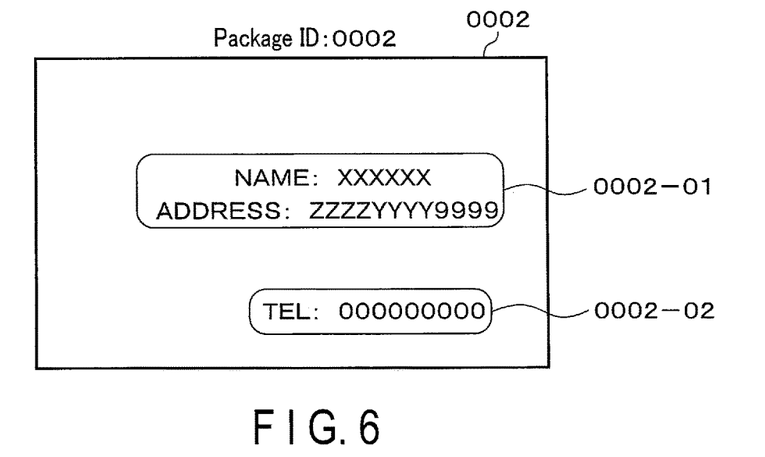
FIG. 6 is a diagram illustrating an operation example of the server according to the embodiment.

FIG. 6 shows another operation example in which the processor 11 partitions a destination image 0002. In the example illustrated in FIG. 6, it is assumed that the processor 11 acquires the destination image 0002 from the processing apparatus 2. Further, the package ID for identifying the package shown in the destination image 0002 is 0002.

In the example illustrated in FIG. 6, the processor 11 searches for "TEL" as a category-indicating keyword from the result of the OCR processing. The processor 11 sets "telephone number" as a category corresponding to "TEL".

The processor 11 extracts a partitioned image 0002-02 that includes the character string of the category "telephone number" (a partitioned image in which "telephone number" is set as the category) based on the position at which "TEL" is written.

The processor 11 also extracts a partitioned image 0002-01 whose category is unknown. For example, the processor 11 partitions a character string area that does not include a category-indicating keyword as a partitioned image 0002-01 whose category is unknown. In addition, the processor 11 may partition a character string area that includes a plurality of keywords and is undividable as a partitioned image 0002-01 whose category is unknown.

Figure 7:
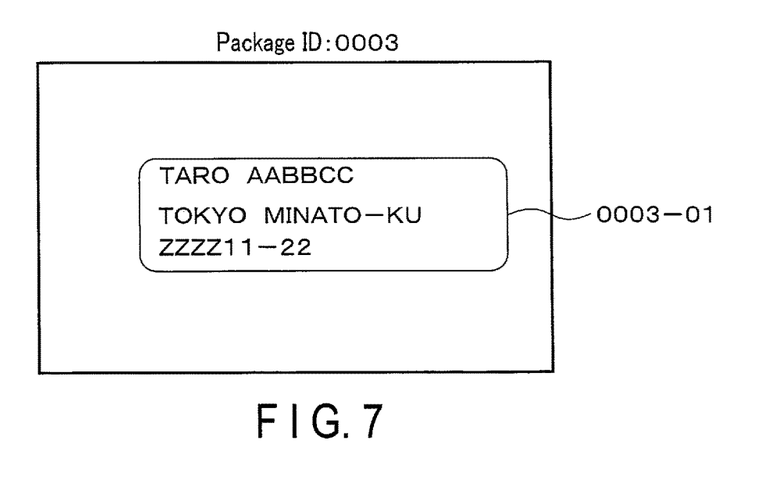
FIG. 7 is a diagram illustrating an operation example of the server according to the embodiment.

Next, still another example of the operation of partitioning a destination image by the processor 11 is described. FIG. 7 shows still another operation example of the operation of partitioning a destination image 0003 by the processor 11. In the example illustrated in FIG. 7, it is assumed that the processor 11 acquires the destination image 0003 from the processing apparatus 2. Further, the package ID for identifying the package shown in the destination image 0003 is 0003.

Herein, suppose the processor 11 was not able to search for a category-indicating keyword from a result of the OCR processing.

The processor 11 partitions the character string area of the destination image 0003 as a partitioned image 0003-01 whose category is unknown.

The processor 11 may partition a character string area that includes a plurality of keywords and is undividable as a partitioned image 0003-01.

The processor 11 has a function of transmitting a partitioned image that includes (or that might include) personal information to the internal VCD 20.

The personal information is information that can identify an individual. Here, the personal information is information that includes both a name and an address. That is, the processor 11 transmits the partitioned image that simultaneously includes both the name and the address to the internal VCD 20.

The definition of the personal information is stored in the NVM 14 or the like. The definition of the personal information may be updated as appropriate.

The processor 11 sets one partitioned image. When the partitioned image is set, the processor 11 determines, based on the category of the partitioned image, whether or not personal information is (can be) included in the partitioned image. Here, if the category of the partitioned image is unknown, the processor 11 determines that the personal information is included in the partitioned image.

In the case where the personal information is defined as information that includes a name, if the category of the partitioned image is "name" or unknown, the processor 11 determines that the personal information is included in the partitioned image. The determination method of the processor 11 and the definition of the personal information are not limited to a specific method or definition.

If it is determined that the personal information is included in the partitioned image, the processor 11 transmits the partitioned image to the internal VCD 20 through the second communication unit 16. That is, the processor 11 receives an input of a character string shown in the partitioned image using the internal VCD 20. When the category of the partitioned image is unknown, the processor 11 may receive an input of the category.

If it is determined that the personal information is not included in the partitioned image, the processor 11 transmits the partitioned image to the external VCD 30 through the third communication unit 17. That is, the processor 11 receives an input of a character string shown in the partitioned image using the external VCD 30. The processor 11 may transmit a plurality of partitioned images that do not include the personal information to respective external VCDs 30 through the third communication unit 17.

The processor 11 performs the same operation on each partitioned image obtained by partitioning the destination image.

The processor 11 acquires a character string shown in each partitioned image through the above-described operation. Upon acquisition of the character strings, the processor 11 integrates the character strings to acquire the description information described in the destination image.

Figure 8:
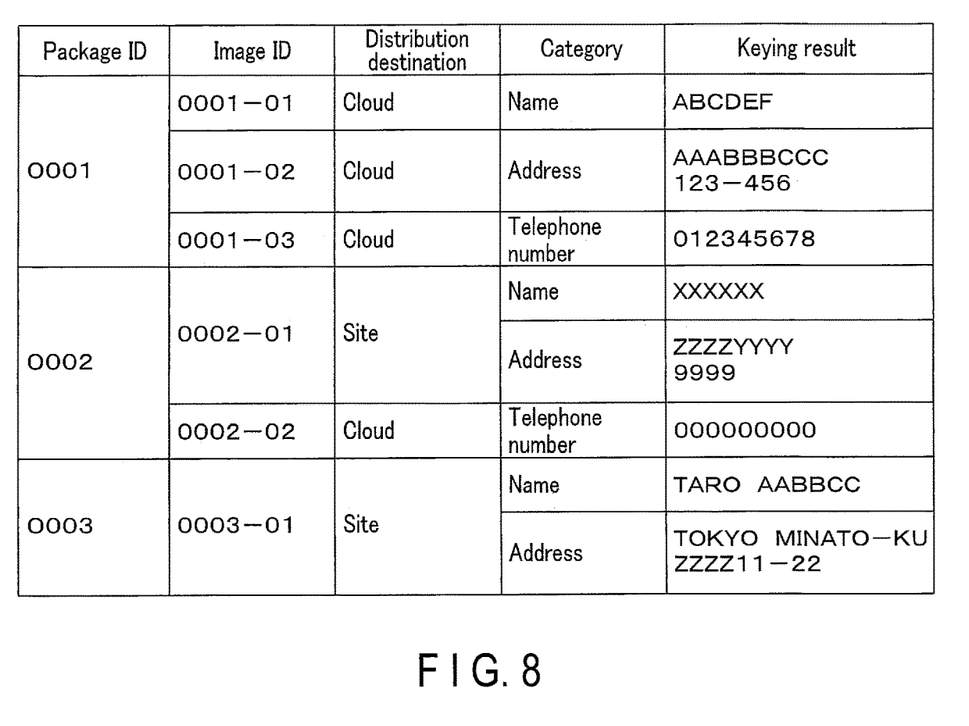
FIG. 8 is a diagram illustrating a configuration example of an integration table according to the embodiment.

FIG. 8 is an integrated table showing description information of each destination image. As illustrated in FIG. 8, the integrated table stores "package ID", "image ID", "distribution destination", "category", "keying result", and the like in association with each other.

As described above, the "package ID" is an ID for identifying a package.

The "image ID" is an ID for identifying a partitioned image partitioned from the destination image. For example, as in the example of FIG. 5, the processor 11 partitions the destination image 0001 into a partitioned image 0001-01, a partitioned image 0001-02, and a partitioned image 0001-03.

The "distribution destination" refers to a destination to which the processor 11 has transmitted the partitioned image. Here, "cloud" refers to an external VCD 30. The "site" refers to an internal VCD 20. As described above, since the categories of the partitioned image 0002-01 and the partitioned image 0003-01 are unknown, the partitioned image 0002-01 and the partitioned image 0003-01 are transmitted to the internal VCD 20.

The "category" refers to a category of a partitioned image. The "category" is set by the processor 11 through the OCR processing or input by the operator.

The "keying result" is a character string that is input to the internal VCD 20 or the external VCD 30 by the operator as a character string shown in a partitioned image.

The processor 11 generates description information by integrating the "category", the "keying result", and the like for each package ID. Upon generation of the description information, the processor 11 transmits the generated description information to the processing apparatus 2 through the first communication unit 15.

Next, a modification in which the processor 11 partitions a destination image is described.

Here, the processor 11 further partitions the partitioned image to which a category is set.

For example, the processor 11 extracts a space, etc. for separating "last name" and "first name" in a partitioned image for which the category "name" is set. The processor 11 partitions the partitioned image into a partitioned image that includes a "last name" and a partitioned image that includes a "first name" based on the position of the extracted space, etc.

The processor 11 partitions the partitioned image for which the category "address" is set into a partitioned image showing a first half of the address and a partitioned image showing a second half of the address. For example, the processor 11 partitions an area in which Chinese characters (or English letters) are written (the first half) and an area in which numbers are written (the second half). The processor 11 may partition a partitioned image into a first-half partitioned image and a second-half partitioned image, using spaces, character strings of prefectures, cities, wards (street numbers), letters, st, commas, semicolons, etc. as a boundary.

The processor 11 may partition the partitioned image into three or more partitioned images. A method of further partitioning a partitioned image by the processor 11 is not limited to a specific method.

The processor 11 may transmit a plurality of partitioned images obtained by further partitioning the partitioned image to respective external VCDs 30 through the third communication unit 17.

Figure 9:
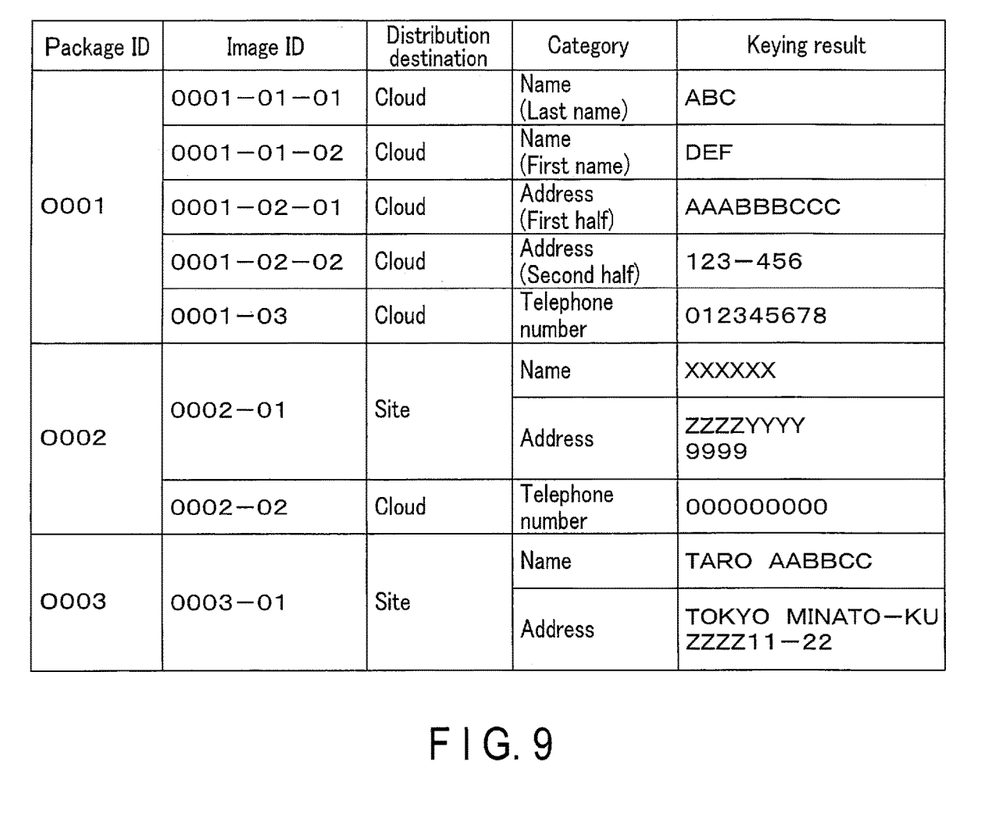
FIG. 9 is a diagram illustrating another configuration example of the integration table according to the embodiment.

FIG. 9 is an integrated table showing the description information of each destination image in the modification.

As illustrated in FIG. 9, the processor 11 partitions the partitioned image 0001-01 for which the category "name" is set into a partitioned image 0001-01-01 and a partitioned image 0001-01-02. The partitioned image 0001-01-01 is an image showing a "last name" of a "name". Further, the partitioned image 0001-01-02 is an image showing a "first name" of a "name".

In addition, the processor 11 partitions the partitioned image 0002-01 in which the category "address" is set into a partitioned image 0001-02-01 and a partitioned image 0001-02-02. The partitioned image 0001-02-01 is an image showing the "first half" of the "address". The partitioned image 0001-02-02 is an image showing the "second half" of the "address".

Next, an operation example of the server 10 is described.

Figure 10:
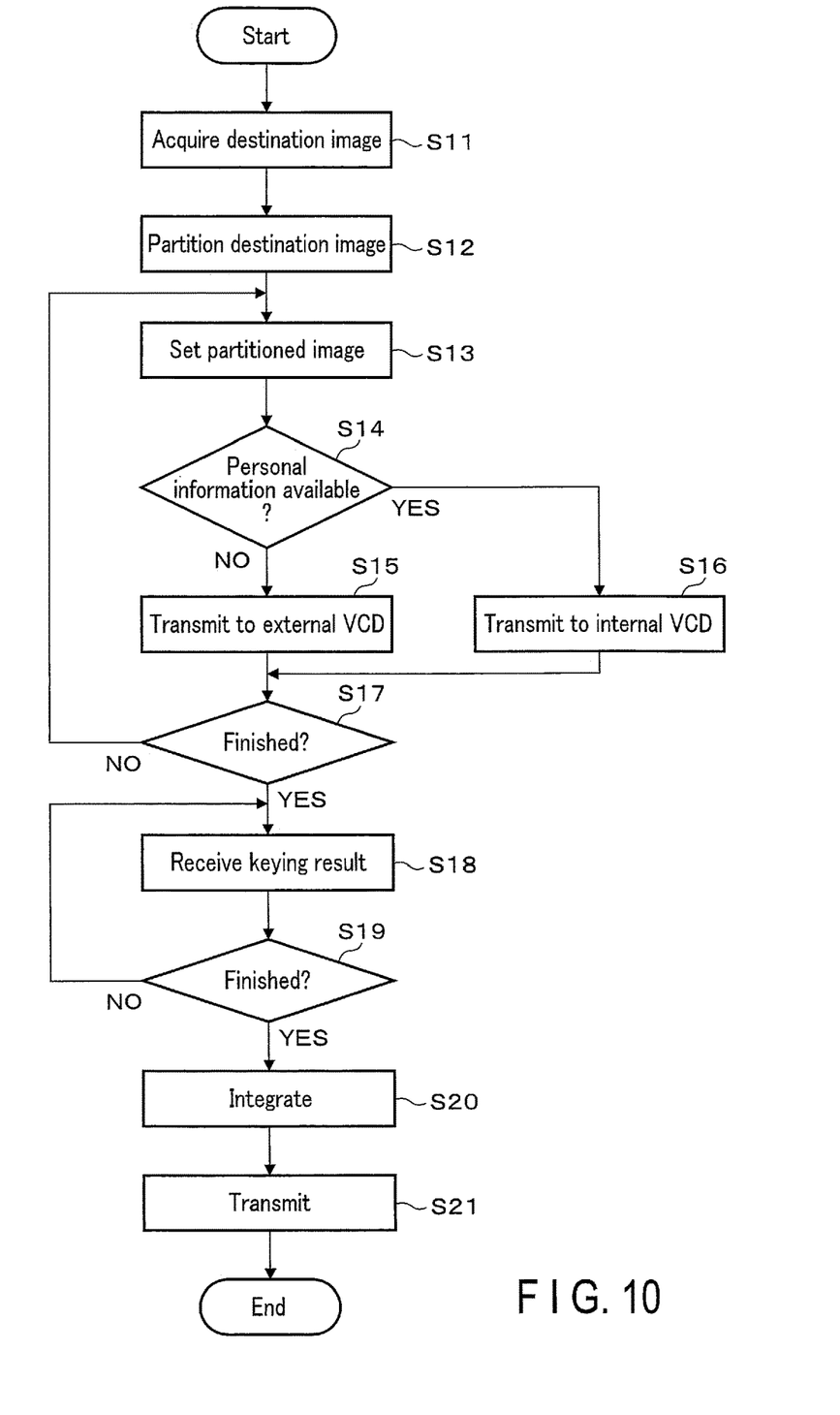
FIG. 10 is a flowchart illustrating an operation example of the server according to the embodiment.

FIG. 10 is a flowchart for explaining an operation example of the server 10.

The processor 11 of the server 10 acquires the destination image from the processing apparatus 2 through the first communication unit 15 (S11). After the destination image is acquired, the processor 11 partitions the acquired destination image into partitioned images (S12).

After the destination image is partitioned, the processor 11 sets one partitioned image (S13). After one partitioned image is set, the processor 11 determines whether or not the set partitioned image includes personal information (S14).

If it is determined that the set partitioned image does not include personal information (No in S14), the processor 11 transmits the set partitioned image to the external VCD 30 through the third communication unit 17 (S15).

If it is determined that the set partitioned image includes personal information (Yes in S14), the processor 11 transmits the set partitioned image to the internal VCD 20 through the second communication unit 16 (S16).

If the partitioned image is transmitted to the external VCD 30 (S15) or the partitioned image is transmitted to the internal VCD 20 (S16), the processor 11 determines whether each partitioned image is transmitted to the internal VCD 20 or the external VCD 30 (S17).

If it is determined that each partitioned image is not transmitted to the internal VCD 20 or the external VCD 30 (No in S17), the processor 11 returns to S13.

If it is determined that each partitioned image is transmitted to the internal VCD 20 or the external VCD 30 (Yes in S17), the processor 11 receives a keying result from the internal VCD 20 or the external VCD 30 (S18).

Upon receipt of the keying result, the processor 11 determines whether or not the keying result is received for each partitioned image (S19). If it is determined that the keying result is not received for each partitioned image (No in S19) the processor 11 returns to step S18.

If it is determined that the keying result is received for each partitioned image (Yes in S19), the processor 11 integrates the keying results and acquires description information of the destination image (S20). Upon acquisition of the description information of the destination image, the processor 11 transmits the description information to the processing apparatus 2 through the first communication unit 15 (S21).

After the description information is transmitted to the processing apparatus 2, the processor 11 finishes the operation.

The processor 11 may acquire a plurality of destination images and perform the operation from S11 to S21 for each destination image. The processor 11 may transmit a plurality of description information items to the processing apparatus 2 in a batch.

The processor 11 may select a destination from the plurality of external VCDs 30 based on a category of the partitioned image. For example, the processor 11 may transmit the partitioned image to which the category "phone number" is set (that is, a partitioned image showing numbers) to an external VCD 30 outside the country.

Available languages may be set for each external VCD 30 or location where the external VCD 30 is deposited. That is, available languages for an operator who handles the external VCD 30 are set. The processor 11 may determine the external VCD 30 to which a partitioned image is to be transmitted based on the set language. For example, the processor 11 transmits a partitioned image that requires an input in Japanese to an external VCD 30 in which Japanese is set as an available language. The processor 11 may transmit a partitioned image that requires an input in numerals to an external VCD 30 in which a language other than Japanese is set as an available language.

The processor 11 may transmit a partitioned image that does not include personal information to the internal VCD 20 through the second communication unit 16. That is, the processor 11 may receive an input of a character string shown in a partitioned image that does not include personal information, using the internal VCD 20.

The processor 11 may perform secondary OCR. The processor 11 performs OCR processing on a destination image acquired from the processing apparatus 2. If the OCR processing is successful, the processor 11 transmits the description information to the processing apparatus 2 based on the result of the OCR processing. If the OCR processing fails, the processor 11 partitions the destination image and receives an input of a character string from the operator.

The processor 11 does not have to partition a destination image. If a destination image includes personal information, the processor 11 transmits the destination image to the internal VCD 20. If a destination image does not include personal information, the processor 11 transmits the destination image to the external VCD 30.

The input system 100 may include an image management server for managing destination images, in addition to the server 10. The image management server stores a destination image in association with an ID specifying the destination image. The processor 11 of the server 10 transmits the ID to the internal VCD 20 or to the external VCD 30. The processor 21 of the internal VCD 20 or the processor 31 of the external VCD 30 acquires a destination image corresponding to the ID from the image management server.

The server configured as described above partitions a destination image into partitioned images. The server transmits a partitioned image that includes personal information to the internal VCD. As a result, the server can prevent personal information from being leaked out to a global network.

Furthermore, the server transmits a partitioned image that does not include personal information to the external VCD. As a result, the server can receive an input of a character string shown in a partitioned image regardless of the location of the operator.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the invention. These embodiments and modifications thereof are included in the scope and gist of the invention and are included in the invention described in the claims and the equivalents thereof.

The invention claimed is:

1. An information processing apparatus comprising:
a first interface;
a second interface connected to an internal device through a first network;
a third interface connected to an external device through a second network; and
a processor configured to:
acquire a character string image that includes a character string through the first interface;
transmit, if the character string image includes personal information, the character string image to the internal device through the second interface and the first network and receive a first input of the character string from the internal device; and
transmit, if the character string image does not include the personal information, the character string image to the external device through the third interface and the second network and receive a second input of the character string from the external device,
wherein
the first network is a local area network,
the second network is the Internet,
the internal device is an internal video coding device (VCD) configured to display the character string image and receive the first input of the character string from a first operator, and
the external device is an external VCD configured to display the character string image and receive the second input of the character string from a second operator.

2. The information processing apparatus according to claim 1, wherein the processor is configured to:
partition the character string image into a plurality of partitioned images,
transmit one of the plurality of partitioned images that includes the personal information to the internal device through the second interface, and receive a third input of the character string from the internal device; and
transmit the partitioned image that does not include the personal information to the external device through the third interface, and receive a fourth input of the character string from the external device.

3. The information processing apparatus according to claim 2, wherein
the processor partitions the character string image into the partitioned images according to a plurality of categories, and
the partitioned image that includes the personal information is a partitioned image for which a predetermined category is set or a partitioned image for which a category is not set.

4. The information processing apparatus according to claim 3, wherein
the processor is configured to:
perform character recognition processing on the character string image, and
set a category based on a result of the character recognition processing.

5. The information processing apparatus according to claim 3,
wherein the category includes any one of a name, an address, or a telephone number.

6. The information processing apparatus according to claim 3, wherein the processor is configured to further partition a partitioned image for which a predetermined category is set into a plurality of partitioned images, and transmit the plurality of partitioned images to the external device through the third interface.

7. The information processing apparatus according to claim 6, wherein
the processor is configured to transmit the plurality of partitioned images obtained by further partitioning the partitioned image to respective external devices.

8. The information processing apparatus according to claim 2, wherein
the processor transmits the plurality of partitioned images that do not include the personal information to respective external devices through the third interface.

9. The information processing apparatus according to claim 1, wherein
the personal information is a name and an address.

10. The information processing apparatus according to claim 1, wherein
the character string includes a destination.

11. The information processing apparatus according to claim 1, wherein
the first interface is connected to a processing apparatus, and
the processor is configured to transmit the input character string to the processing apparatus through the first interface.

12. An information processing method executed by a processor, the method comprising:
acquiring a character string image that includes a character string;
transmitting, if the character string image includes personal information, the character string image to an internal device through a first network and receiving a first input of the character string from the internal device; and
transmitting, if the character string image does not include the personal information, the character string image to an external device through a second network and receiving a second input of the character string from the external device,
wherein
the first network is a local area network,
the second network is the Internet,
the internal device is an internal video coding device (VCD) configured to display the character string image and receive the first input of the character string from a first operator, and
the external device is an external VCD configured to display the character string image and receive the second input of the character string from a second operator.

13. A program to be executed by a processor, the program causing the processor to implement:
a function of acquiring a character string image that includes a character string;
a function of transmitting, if the character string image includes personal information, the character string image to an internal device through a first network and receiving a first input of the character string from the internal device; and
a function of transmitting, if the character string image does not include the personal information, the character string image to an external device through a second network and receiving a second input of the character string from the external device, wherein
- the first network is a local area network,
- the second network is the Internet,
- the internal device is an internal video coding device (VCD) configured to display the character string image and receive the first input of the character string from a first operator, and
- the external device is an external VCD configured to display the character string image and receive the second input of the character string from a second operator.

* * * * *